(12) United States Patent
Tossavainen et al.

(10) Patent No.: US 9,389,688 B2
(45) Date of Patent: Jul. 12, 2016

(54) DISPLAY APPARATUS PRODUCING AUDIO AND HAPTIC OUTPUT

(75) Inventors: Antero Tossavainen, Espoo (FI); Vesa Kajanus, Oulunsalo (FI); Petri Soronen, Oulu (FI); Jarkko Viita, Kiviniemi (FI)

(73) Assignee: Nokia Technologies Oy, Espoo (FI)

( * ) Notice: Subject to any disclaimer, the term of this patent is extended or adjusted under 35 U.S.C. 154(b) by 305 days.

(21) Appl. No.: 13/976,268

(22) PCT Filed: Dec. 31, 2010

(86) PCT No.: PCT/IB2010/056149
§ 371 (c)(1),
(2), (4) Date: Sep. 17, 2013

(87) PCT Pub. No.: WO2012/090031
PCT Pub. Date: Jul. 5, 2012

(65) Prior Publication Data
US 2014/0145836 A1    May 29, 2014

(51) Int. Cl.
| | | |
|---|---|---|
| *G08B 6/00* | (2006.01) | |
| *G06F 3/01* | (2006.01) | |
| *H04R 7/04* | (2006.01) | |
| *G06F 3/041* | (2006.01) | |
| *G06F 3/02* | (2006.01) | |
| *G09B 21/00* | (2006.01) | |

(52) U.S. Cl.
CPC *G06F 3/016* (2013.01); *H04R 7/04* (2013.01); *G06F 3/0202* (2013.01); *G06F 3/041* (2013.01); *G06F 2203/04103* (2013.01); *G09B 21/003* (2013.01); *G09B 21/007* (2013.01); *H04R 2400/03* (2013.01); *H04R 2499/11* (2013.01)

(58) Field of Classification Search
USPC ............................................. 340/407.2
See application file for complete search history.

(56) References Cited

U.S. PATENT DOCUMENTS

| | | | | |
|---|---|---|---|---|
| 5,416,494 | A * | 5/1995 | Yokota | G09G 3/12 313/506 |
| 6,118,435 | A * | 9/2000 | Fujita | G06F 3/016 345/173 |
| 6,586,889 | B1 * | 7/2003 | Yaniv | G09G 3/22 313/309 |
| 6,661,563 | B2 * | 12/2003 | Hayashi | G09F 9/372 345/107 |

(Continued)

FOREIGN PATENT DOCUMENTS

| | | |
|---|---|---|
| EP | 1544720 | 6/2005 |
| WO | 2010085575 | 7/2010 |

OTHER PUBLICATIONS

International Search Report received for corresponding Patent Cooperation Treaty Application No. PCT/IB2010/056149, dated Sep. 28, 2011, 4 pages.

*Primary Examiner* — Jennifer Mehmood
*Assistant Examiner* — Rufus Point
(74) *Attorney, Agent, or Firm* — Harrington & Smith

(57) ABSTRACT

An apparatus comprising; a first part configured to form at least part of the case of the apparatus; a second part configured to form at least part of the display for the apparatus; at least one actuator coupled to the second part and configured to apply a force to the second part to generate a displacement of the second part; drive circuitry coupled to the at least one actuator and configured to drive the actuator to produce both audio and haptic outputs; and a suspender configured to couple the first part and the second part.

21 Claims, 8 Drawing Sheets

(56) References Cited

U.S. PATENT DOCUMENTS

| | | | | |
|---|---|---|---|---|
| 7,167,168 B2* | 1/2007 | Nose | G02F 1/13718 | 315/169.1 |
| 7,176,903 B2* | 2/2007 | Katsuki | G06F 3/0436 | 345/173 |
| 7,215,329 B2* | 5/2007 | Yoshikawa | G06F 3/0414 | 178/18.01 |
| 7,227,537 B2* | 6/2007 | Nakayama | G06F 3/041 | 345/173 |
| 7,656,675 B2* | 2/2010 | Kim | G06F 1/1626 | 174/520 |
| 7,684,953 B2* | 3/2010 | Feist | H01C 10/12 | 702/139 |
| 7,714,845 B2* | 5/2010 | Matsumoto | G06F 3/045 | 345/173 |
| 7,979,146 B2* | 7/2011 | Ullrich | G06F 3/016 | 340/407.1 |
| 7,999,660 B2* | 8/2011 | Cybart | G06F 3/016 | 340/12.54 |
| 8,077,162 B2* | 12/2011 | Endo | G06F 3/0436 | 178/18.01 |
| 8,144,133 B2* | 3/2012 | Wang | G06F 3/0414 | 345/104 |
| 8,154,527 B2* | 4/2012 | Ciesla | G06F 3/04886 | 178/18.01 |
| 8,177,942 B2* | 5/2012 | Paolini, Jr. | C08J 7/18 | 156/272.2 |
| 8,279,193 B1* | 10/2012 | Birnbaum | G06F 3/016 | 340/407.2 |
| 8,279,623 B2* | 10/2012 | Idzik | B06B 1/00 | 310/348 |
| 8,310,457 B2* | 11/2012 | Faubert | G06F 1/1626 | 178/18.01 |
| 8,330,590 B2* | 12/2012 | Poupyrev | G06F 3/03543 | 340/407.2 |
| 8,334,835 B2* | 12/2012 | Shen | G06F 3/0412 | 345/104 |
| 8,339,250 B2* | 12/2012 | Je | G06F 3/016 | 340/4.12 |
| 8,345,013 B2* | 1/2013 | Heubel | G06F 3/016 | 340/407.1 |
| 8,369,887 B2* | 2/2013 | Choe | G06F 1/1626 | 340/407.1 |
| 8,384,679 B2* | 2/2013 | Paleczny | G06F 3/016 | 178/18.01 |
| 8,421,610 B2* | 4/2013 | Ahn | G06F 3/016 | 340/407.2 |
| 8,704,780 B2* | 4/2014 | Son | G06F 1/1626 | 310/317 |
| 9,160,331 B2* | 10/2015 | Bakken | G06F 3/044 | |
| 9,235,274 B1* | 1/2016 | St. Jacques | G06F 3/03548 | |
| 2002/0025837 A1* | 2/2002 | Levy | G06F 3/0235 | 455/566 |
| 2002/0084721 A1* | 7/2002 | Walczak | H01L 41/08 | 310/339 |
| 2003/0067448 A1* | 4/2003 | Park | G06F 3/0414 | 345/173 |
| 2003/0067449 A1* | 4/2003 | Yoshikawa | G06F 3/016 | 345/173 |
| 2006/0049920 A1* | 3/2006 | Sadler | G06F 1/1626 | 340/407.1 |
| 2006/0181522 A1* | 8/2006 | Nishimura | G06F 3/016 | 345/177 |
| 2006/0192657 A1* | 8/2006 | Nishimura | G06F 3/016 | 340/407.2 |
| 2008/0204417 A1* | 8/2008 | Pierce | G06F 3/0202 | 345/168 |
| 2008/0218488 A1* | 9/2008 | Yang | G09G 3/20 | 345/173 |
| 2009/0002140 A1* | 1/2009 | Higa | G06F 3/0412 | 340/407.1 |
| 2009/0121848 A1* | 5/2009 | Yuk | G06F 3/03547 | 340/407.2 |
| 2009/0128503 A1* | 5/2009 | Grant | G06F 3/016 | 345/173 |
| 2009/0167704 A1* | 7/2009 | Terlizzi | G06F 3/016 | 345/173 |
| 2009/0250267 A1* | 10/2009 | Heubel | G06F 3/041 | 178/18.03 |
| 2010/0090813 A1* | 4/2010 | Je | G06F 3/016 | 340/407.2 |
| 2010/0141408 A1* | 6/2010 | Doy | G06F 3/016 | 340/407.2 |
| 2010/0156818 A1* | 6/2010 | Burrough | G06F 3/016 | 345/173 |
| 2010/0156823 A1* | 6/2010 | Paleczny | G06F 3/041 | 345/173 |
| 2010/0160016 A1* | 6/2010 | Shimabukuro | G07F 17/3209 | 463/16 |
| 2010/0225600 A1* | 9/2010 | Dai | G06F 3/016 | 345/173 |
| 2010/0231540 A1* | 9/2010 | Cruz-Hernandez | G06F 3/0488 | 345/173 |
| 2010/0231541 A1* | 9/2010 | Cruz-Hernandez | G06F 3/0488 | 345/173 |
| 2010/0245254 A1* | 9/2010 | Olien | G06F 3/041 | 345/173 |
| 2010/0250071 A1* | 9/2010 | Pala | B60K 35/00 | 701/48 |
| 2010/0259368 A1* | 10/2010 | Fahn | G06F 3/041 | 340/384.1 |
| 2010/0277439 A1* | 11/2010 | Charlier | G06F 1/1616 | 345/176 |
| 2011/0025609 A1* | 2/2011 | Modarres | G06F 3/016 | 345/173 |
| 2011/0255732 A1* | 10/2011 | Kwon | H04R 9/06 | 381/396 |
| 2011/0261021 A1* | 10/2011 | Modarres | G06F 3/016 | 345/177 |
| 2012/0229424 A1* | 9/2012 | Behles | G06F 1/1601 | 345/177 |

\* cited by examiner

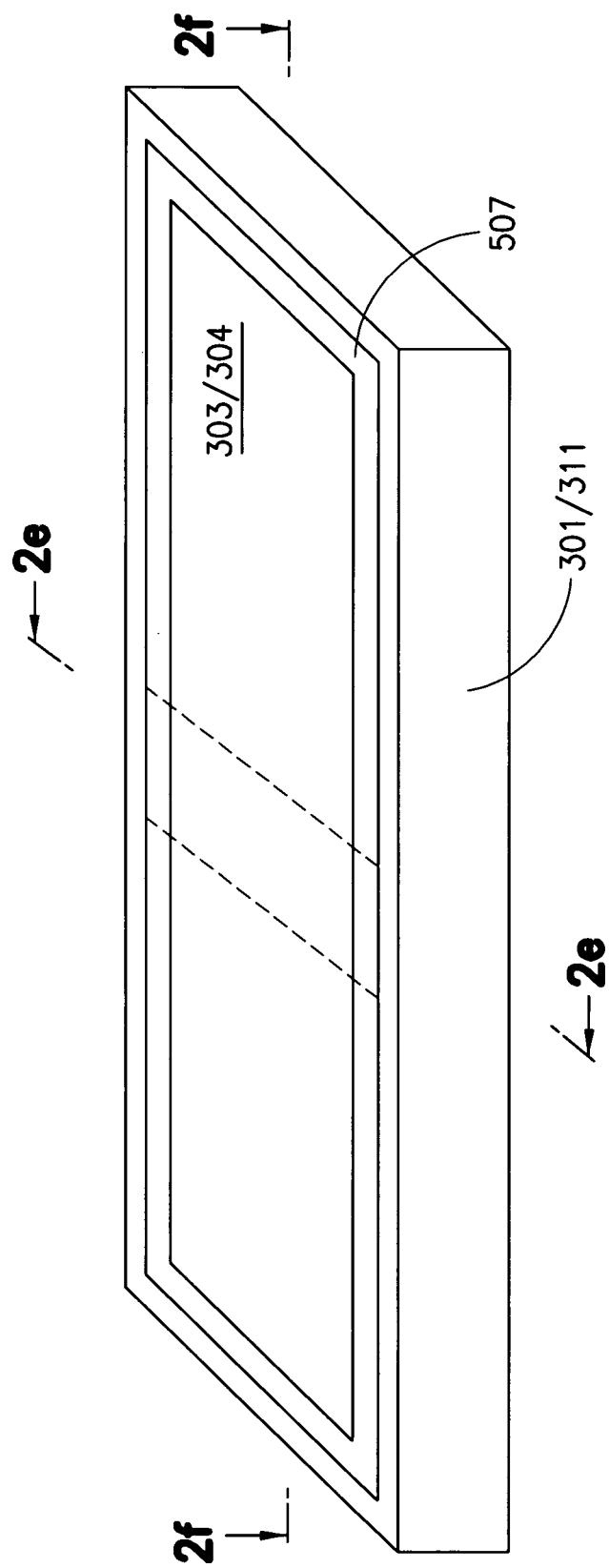

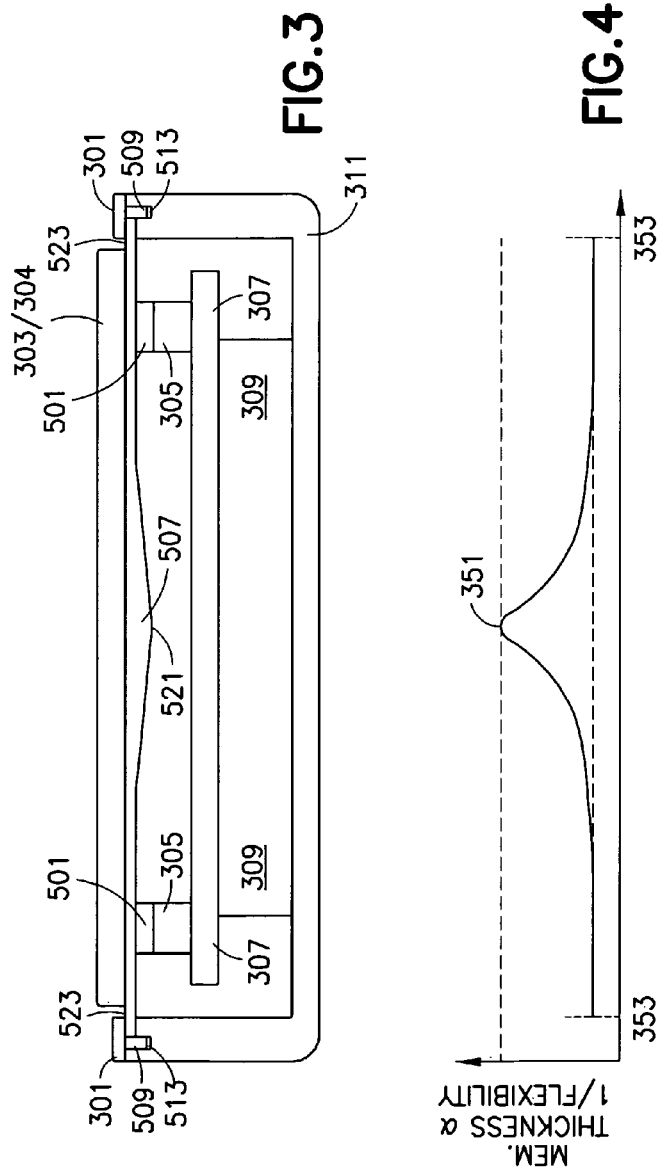

DISPLAY APPARATUS PRODUCING AUDIO AND HAPTIC OUTPUT

RELATED APPLICATION

This application was originally filed as PCT Application No. PCT/IB2010/056149 filed Dec. 31, 2010.

FIELD OF THE APPLICATION

The present invention relates to a display apparatus providing speaker functionality. The invention further relates to, but is not limited to, display apparatus providing speaker functionality for use in mobile devices.

BACKGROUND OF THE APPLICATION

Many portable devices, for example mobile telephones, are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the operating mode of the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

However such touchscreen inputs have a disadvantage with respect to mechanical keys in that the user does not experience the usual expected click or mechanical switch feedback to indicate that an input has been detected. To attempt to overcome this some equipment has been provided with a mechanical or audible simulation of a key press. Some touch screen devices are equipped with device haptic feedback, in other words an ordinary vibration is used to make the whole device shake (and also provide an audio cue of the key press) as the user touches the screen and is detected. These device-haptic devices however are themselves problematic as they require significant current to operate in order to generate significant feedback force. This is generally because the construction of the device often requires that the front window is firmly located or fixed to the surrounding frame or connected in such a way to significantly damp the force generated by the actuator before it is applied.

Furthermore some devices use electro-acoustic transducers to produce audio for earpiece and integrated hands free (IHF) operations as well as for alert tones. The moving coil dynamic speaker configuration used is typically relatively large in relation to the volume within the device and require specific signal processing considerations in order that the acoustic frequency response is acceptable. Furthermore moving coil transducers can attract contaminants such as small iron particles from within the internal volume of the device and also through ports provided to enable acoustic wave transmission from the speaker to the external environment. These contaminants can cause distortion and faults within the speakers significantly reducing the lifetime of the device.

Therefore a typical device configured to produce both audio and haptic outputs would typically require a vibrator component and an electro-acoustic transducer which incurs both cost of component, and also volume cost as they are relatively difficult to fit into a modern device and need to be located far from the mass centric point in order to generate a good performance. Furthermore in devices generating a multi-channel audio signal these modern devices require additional volume and component cost as additional transducers are required to generate each of the audio channels.

STATEMENT OF THE APPLICATION

This application proceeds from the consideration that the provision of a flexible membrane connecting a display to the cover or main body of the device and capable of transferring the force provided by an actuator to the user by flexing and not significantly damping the force may provide both the physical and mechanical support for the display without unduly limiting the action of the display in producing tactile or haptic feedback and audio speaker functionality.

It is an aim of at least some embodiments of the invention to address one or more of these problems.

According to an aspect, there is provided an apparatus comprising an apparatus comprising: a first part configured to form at least part of the case of the apparatus; a second part configured to form at least part of the display for the apparatus; at least one actuator coupled to the second part and configured to apply a force to the second part to generate a displacement of the second part; drive circuitry coupled to the at least one actuator and configured to drive the actuator to produce both audio and haptic outputs; and a suspender configured to couple the first part and the second part.

The drive circuitry may comprise: an audio signal filter configured to receive an audio signal; a vibration signal filter configured to receive a vibration signal; and a combiner configured to combine the output of the audio signal filter and the vibration signal filter.

The audio filter may comprise a high pass filter.

The vibration signal filter may comprise a low pass filter.

The at least one actuator may comprise at least two actuators configured to coupled to the second part at substantially different regions, wherein the drive circuitry may be configured to drive each actuator separately.

The drive circuitry may comprise: a first channel filter configured to receive a first actuator channel signal; a second channel filter configured to receive a second actuator channel signal; a first combiner configured to combine the lower frequency components of a filtered first actuator channel signal and a filtered second actuator channel signal; a first channel combiner configured to combine a combined lower frequency components of a filtered first actuator channel signal and a filtered second actuator channel signal and a higher frequency components of the filtered first actuator channel signal; and a second channel combiner to combine a combined lower frequency components of a filtered first actuator channel signal and a filtered second actuator channel signal and a higher frequency components of the filtered second actuator channel signal.

The drive circuitry may be configured to couple the first channel combiner output to a first actuator and the second channel combiner to a second actuator.

The substantially different regions may be isolated from each other.

The suspension may comprise a flexible membrane configured to be non uniform in thickness, and may comprise a maximum thickness in an area approximately between the substantially different regions.

The second part may be configured to be resiliently coupled to the first part for an area approximately between the substantially different regions.

The first part may comprise: a body part; and a frame part, wherein the suspender may be configured to be attached between the body part and the frame part.

The second part may comprise: a front window layer; at least one display layer; and at least one touch interface layer.

The suspender may be configured to be coupled by at least one of: between two of the front window layer, at least one display layer, and at least one touch interface layer; between two of the display layers; and between two of the touch interface layers.

The suspender may comprise at least part of: one of the display layers and one of the touch interface layers.

The suspender may comprise a suspension ring configured to be located within a recess of the first part, wherein the suspension ring and recess may form a first area of contact.

The actuator may be configured to be further coupled to the first part by a fixed coupling.

The actuator may be at least one of: a piezoelectric actuator; a dynamic eccentric mass actuator; a moving coil actuator; and a moving magnet actuator.

The suspender may comprise at least one of: an elastomer; a silicone foil; a polyethylene terephthalate (PET) polyester film; and a polycarbonate film.

According to a second aspect there is provided a method of operating an apparatus comprising a first part configured to form at least part of the case of the apparatus and a second part configured to form at least part of the display for the apparatus, the method comprising: coupling at least one actuator to the second part; applying a force, by the at least one actuator, to the second part to generate a displacement of the second part; coupling drive circuitry to the at least one actuator; driving, by the drive circuitry, the actuator to produce both audio and haptic outputs; and coupling by a suspension the first part and the second part.

Driving the actuator may comprise: filtering an audio signal; filtering a vibration signal; and combining the output of the audio signal filtering and the vibration signal filtering.

Filtering an audio signal may comprise high pass filtering the audio signal.

Filtering a vibration signal may comprise low pass filtering a vibration signal.

Applying a force may comprise applying at least two forces each by a separate actuator coupled to the second part at substantially different regions, wherein driving the actuator may comprise driving each actuator separately.

Driving the actuator may comprise: filtering a first channel signal associated with a first of the actuators; filtering a second channel signal associated with a second of the actuators; combining the lower frequency components of a filtered first actuator channel signal and a filtered second actuator channel signal; combining a combined lower frequency component of a filtered first actuator channel signal and a filtered second actuator channel signal and a higher frequency component of the filtered first actuator channel signal; and combining a combined lower frequency component of a filtered first actuator channel signal and a filtered second actuator channel signal and a higher frequency component of the filtered second actuator channel signal.

Driving the actuator may comprise coupling the a combined lower frequency component of a filtered first actuator channel signal and a filtered second actuator channel signal and a higher frequency component of the filtered first actuator channel signal to a first actuator and the combined lower frequency component of a filtered first actuator channel signal and a filtered second actuator channel signal and a higher frequency component of the filtered first actuator channel signal to a second actuator.

The substantially different regions may be isolated from each other.

Coupling by a suspension the first part and the second part may comprise coupling the first part and the second part by a flexible membrane configured to be non uniform in thickness, and may comprise a maximum thickness in an area approximately between the substantially different regions.

The method may comprise resiliently coupling the second part to the first part for an area approximately between the substantially different regions.

The first part may comprise: a body part; and a frame part, wherein coupling by a suspension the first part and the second part may comprise attaching the suspension between the body part and the frame part.

The second part may comprise: a front window layer; at least one display layer; and at least one touch interface layer.

Coupling by a suspension the first part and the second part may comprise attaching the suspension for at least one of: between two of the front window layer, at least one display layer, and at least one touch interface layer; between two of the display layers; and between two of the touch interface layers.

The suspension may comprise at least part of: one of the display layers and one of the touch interface layers.

Coupling by a suspension may comprise forming a suspension ring configured to be located within a recess of the first part, wherein the suspension ring and recess form a first area of contact.

The method may further comprise coupling the actuator to the first part by a fixed coupling.

The actuator may be at least one of: a piezoelectric actuator; a dynamic eccentric mass actuator; a moving coil actuator; and a moving magnet actuator.

The suspension may comprise at least one of: an elastomer; a silicone foil; a polyethylene terephthalate (PET) polyester film; and a polycarbonate film.

According to a third aspect there is provided there is provided an apparatus comprising: a first means configured to form at least part of the case of the apparatus; a second means configured to form at least part of the display for the apparatus; at least one actuator means coupled to the second part and configured to apply a force to the second part to generate a displacement of the second part; drive means coupled to the at least one actuator means and configured to drive the actuator means to produce both audio and haptic outputs; and a coupling means for coupling the first part and the second part.

The drive means may comprise: an audio signal filter configured to receive an audio signal; a vibration signal filter configured to receive a vibration signal; and a combiner configured to combine the output of the audio signal filter and the vibration signal filter.

The audio signal filter may comprise a high pass filter.

The vibration signal filter may comprise a low pass filter.

The at least one actuator means may comprise at least two actuator means configured to coupled to the second part at substantially different regions, wherein the drive means may be configured to drive each actuator separately.

The drive means may comprise: a first channel filter configured to receive a first actuator channel signal; a second channel filter configured to receive a second actuator channel signal; a first combiner configured to combine the lower frequency components of a filtered first actuator channel signal and a filtered second actuator channel signal; a first channel combiner configured to combine a combined lower frequency components of a filtered first actuator channel signal and a filtered second actuator channel signal and a higher frequency components of the filtered first actuator channel signal; and a second channel combiner to combine a combined lower frequency components of a filtered first actuator channel signal and a filtered second actuator channel signal and a higher frequency components of the filtered second actuator channel signal.

The drive means may be configured to couple the first channel combiner output to a first actuator means and the second channel combiner to a second actuator means.

The substantially different regions may be isolated from each other.

The coupling means may comprise flexible membrane configured to be non uniform in thickness, and may comprise a maximum thickness in an area approximately between the substantially different regions.

The second means may be configured to be resiliently coupled to the first means for an area approximately between the substantially different regions.

The first means may comprise: a body part; and a frame part, wherein the coupling means is configured to be attached between the body part and the frame part.

The second means may comprise: a front window layer; at least one display layer; and at least one touch interface layer.

The coupling means may be configured to be: between two of the front window layer, at least one display layer, and at least one touch interface layer; between two of the display layers; and between two of the touch interface layers.

The coupling means may comprise at least part of: one of the display layers and one of the touch interface layers.

The coupling means may comprise a suspension ring configured to be located within a recess of the first means, wherein the suspension ring and recess form a first area of contact.

The at least one of the actuator means may be configured to be further coupled to the first part by a fixed coupling.

The at least one actuator means may be at least one of: a piezoelectric actuator; a dynamic eccentric mass actuator; a moving coil actuator; and a moving magnet actuator.

The coupling means may comprise at least one of: an elastomer; a silicone foil; a polyethylene terephthalate (PET) polyester film; and a polycarbonate film.

SUMMARY OF FIGURES

For better understanding of the present invention, reference will now be made by way of example to the accompanying drawings in which:

FIG. 2d shows a schematic view of apparatus according to some further embodiments;

FIG. 3 shows a further schematic sectioned view of the example topology for apparatus according to some embodiments;

FIG. 4 shows a schematic view of the profile of the flexible membrane thickness as shown in FIGS. 2 and 3 according to some embodiments;

FIG. 5 shows a schematic view of the effect of the changing profile according to some embodiments;

DESCRIPTION OF EXAMPLE EMBODIMENTS

The application describes apparatus and methods of construction for apparatus suitable for generating touch screen devices capable of creating a more interactive user experience and audio generation through the screen. Thus as described herein in embodiments of the application, the use of a flexible membrane for connecting the display with the cover or case enables the display to be driven substantially in a manner suitable for combining both haptic and audio signals and also in some embodiments in a manner suitable for multichannel audio signals. Driving the display in such ways greatly enhances the user haptic experience and generates acoustic waves suitable for earpiece or speaker replacement. The construction of such a display module and some examples of its implementation within apparatus is described in further detail hereafter.

Figure 1:
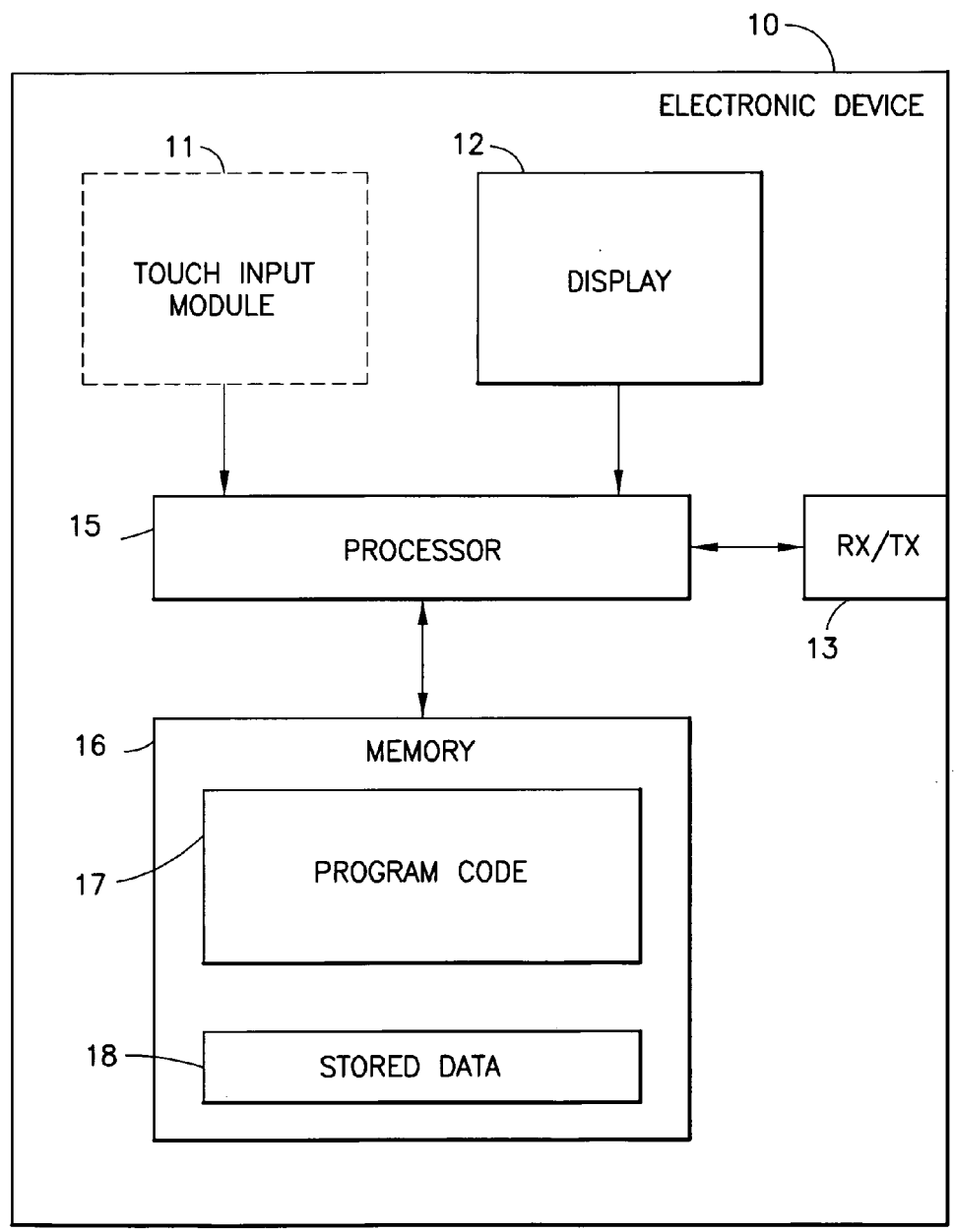
FIG. 1 shows schematically an apparatus suitable for employing embodiments of the application.

With respect to FIG. 1 a schematic block diagram of an example electronic device 10 or apparatus on which embodiments of the application can be implemented. The apparatus 10 is such embodiments configured to provide improved haptic feedback and audio generation.

The apparatus 10 is in some embodiments a mobile terminal, mobile phone or user equipment for operation in a wireless communication system. In other embodiments, the electronic device is any suitable electronic device configured to provide a image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched. For example in some embodiments the touch-pad can be a touch-sensitive keypad which can in some embodiments have no markings on it and in other embodiments have physical markings or designations on the front window. An example of such a touch sensor can be a touch sensitive user interface to replace keypads in automatic teller machines (ATM) that does not require a screen mounted underneath the front window projecting a display. The user can in such embodiments be notified of where to touch by a physical identifier—such as a raised profile, or a printed layer which can be illuminated by a light guide.

The apparatus 10 comprises a touch input module or user interface 11, which is linked to a processor 15. The processor 15 is further linked to a display 12. The processor 15 is further linked to a transceiver (TX/RX) 13 and to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component. In such embodiments the touch interface module 11 and display 12 can be referred to as the display part or touch display part.

The processor 15 can in some embodiments be configured to execute various program codes. The implemented program codes, in some embodiments can comprise such routines as touch capture digital processing or configuration code where the touch input module inputs are detected and processed, display image processing and image interaction code where the data to be passed to generate the display images is generated for example based on the detection of the input, or actuator processing generating an actuator signal for driving an actuator. The implemented program codes can in some embodiments be stored for example in the memory 16 and specifically within a program code section 17 of the memory 16 for retrieval by the processor 15 whenever needed. The memory 15 in some embodiments can further provide a section 18 for storing data, for example data that has been processed in accordance with the application, for example display information data.

The touch input module 11 can in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition.

The apparatus 10 can in some embodiments be capable of implementing the processing techniques at least partially in hardware, in other words the processing carried out by the processor 15 may be implemented at least partially in hardware without the need of software or firmware to operate the hardware.

The transceiver 13 in some embodiments enables communication with other electronic devices, for example in some embodiments via a wireless communication network.

The display 12 may comprise any suitable display technology. For example the display element can be located below the touch input module and project an image through the touch input module to be viewed by the user. The display 12 can employ any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). In some embodiments the display 12 employs one of the display technologies projected using a light guide to the display window. As described herein the display 12 in some embodiments can be implemented as a physical fixed display. For example the display can be a physical decal or transfer on the front window. In some other embodiments the display can be located on a physically different level from the rest of the surface, such a raised or recessed marking on the front window. In some other embodiments the display can be a printed layer illuminated by a light guide under the front window.

Figure 2A:
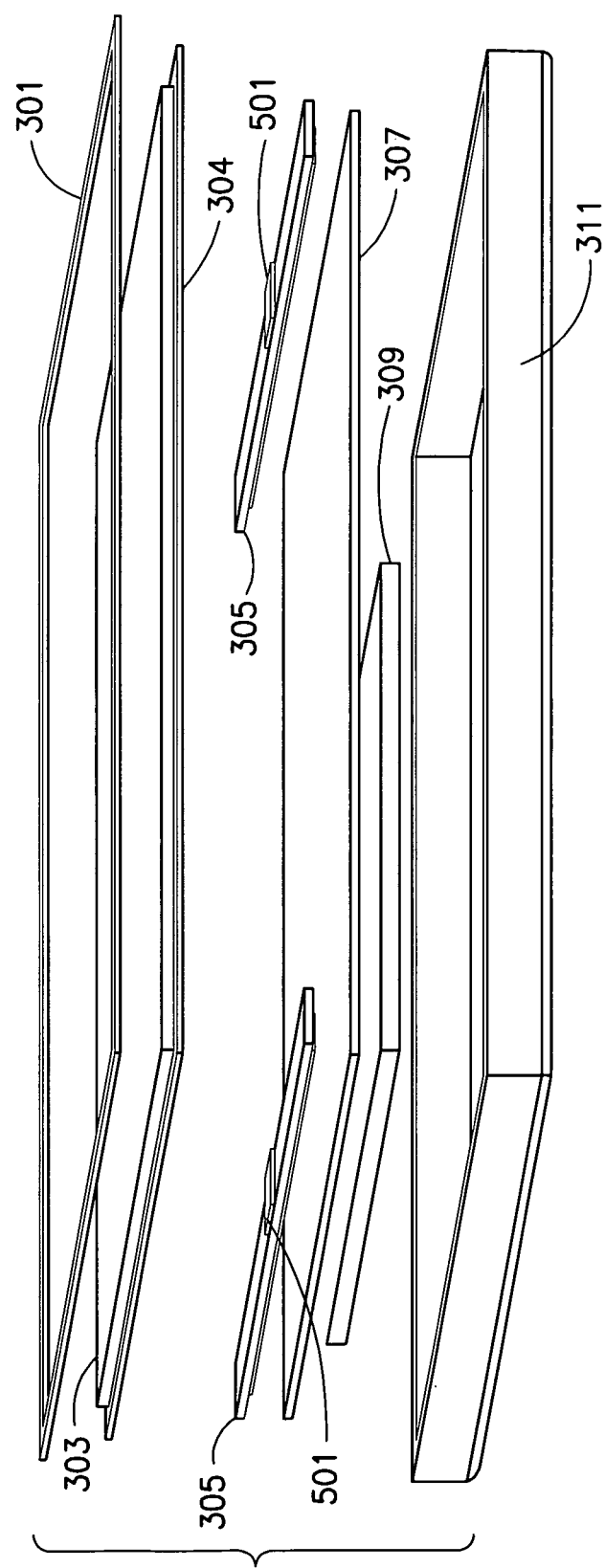
FIG. 2a shows a schematic exploded elevation view of example topology for apparatus according to some embodiments.

With respect to FIG. 2a an exploded view of an example apparatus or device according to some embodiments of the application are shown. Further exemplary views are shown with respect to FIGS. 2b to 2f. Furthermore with respect to FIG. 3 an assembled sectioned view of the example apparatus is shown. The apparatus 10 can comprise a body part 311 or outer frame which can be constructed from any suitable material and is configured to provide a structure to which other components may be coupled and/or may protect other components from damage. In some embodiments the body part 311 can comprise an inner surface to which internal components are located and an outer surface to which external components are located and which is exposed to the elements. In some embodiments the junction between the inner surface and the outer surface is connected via a filet or chamfer to smooth the junction. In such embodiments by smoothing the junction there is less chance of damaging other components.

The apparatus 10 in some embodiments comprises a battery 309. The battery 309 can be any suitable electrical power generating means and can employ any suitable electrical charge storage or generating technology, for example but not exclusively lithium polymer cells, fuel cell, solar cell or a combination of suitable technologies. In some embodiments the battery 309 is rechargeable or refillable and is connected via a port in the body part 311 to be able to receive a recharging or refilling coupling, for example a recharger plug to couple to a recharging socket for supplying power to recharge the battery 309. In some embodiments the battery 309 is configured to be located within the body part 311. For example the body part 311 can in some embodiments employs moulding tabs or other locating means on the inner surface to fix or locate the battery in position.

In some embodiments the apparatus 10 further employs a printed wiring board (PWB) 307. The printed wiring board 307 is configured to provide a suitable structure for locating electrical components. For example in some embodiments the processor 15, transceiver 13 and memory 16 shown in FIG. 1 can be located on the printed wiring board. In some embodiments there can be employed more than one printed wiring board 307 layer. Furthermore in some embodiments the printed wiring board 307 can be replaced by a printed circuit board (PCB) or surface mounted board suitable for locating surface mounted electrical components on it. In some embodiments the printed wiring board 307 is configured to be coupled to the battery 309 whereby the battery 309 is configured to supply the printed wiring board 307 with power to operate the electrical components located on it. In the example shown in FIGS. 2a and 3 the printed wiring board is located over the battery and within the body part 311. It would be understood that in some embodiments the body part 311 can employ moulding tabs or other locating means on the inner surface to fix or locate the printed wiring board in position.

The apparatus 10 further comprises at least one piezoelectric actuator 305. In the example shown in FIG. 2a the apparatus employs a first piezoelectric actuator 305 located towards one end of body part 311 and a second piezoelectric actuator 305 located at the opposite end of the body part 311.

The piezoelectric actuator 305 is in some embodiments coupled to receive power from the battery 309 via the printed wiring board 307 and to produce a physical moment or force in response to a current passed through the piezoelectric actuator 305.

Each piezoelectric actuator 305 furthermore can in some embodiments be located within the case body by an inner recess which is configured to receive the piezoelectric actuator 305. The inner recess 511 is configured to locate either end of the piezoelectric actuator 305 in position such that in some embodiments when the piezoelectric actuator 305 is operated the ends of the piezoelectric actuator are fixed nodes. Furthermore as the piezoelectric actuator 305 in some embodiments is suspended at each end by the body part 311 recess 511 such that when a current is applied the piezoelectric actuator 305 flexes and can 'push' against the case body thus producing a motion in and away from the direction of the display. In other words where the display is considered to be in a plane designated the X-Y axis the actuations of the piezoelectric actuator to actuate or produce a force in a "Z" dimension or direction. In some embodiments there is configured to be a suitable air gap between the piezoelectric actuator 305 and the printed wiring board 307 in order to prevent 'clipping' of the actuation of the piezoelectric actuator 305.

Although the following examples are described with respect to the use of a piezoelectric actuator 305 it would be understood that any suitable actuator capable of producing a translational force to a display could be implemented in some further embodiments. For example in some other embodiments an eccentric mass can be employed to produce a force which may be passed. In further examples a moving coil or moving magnet actuator can generate the force.

In some further embodiments the display can directly experience the force which is transmitted from the piezoelectric actuator to the display assembly 304 in such a manner to permit a planar motion of the display assembly. For example in some embodiments the piezoelectric actuator is shaped with a suitable thickening to in a central portion to provide a projection through which force can be passed to a display.

In some embodiments the piezoelectric actuator 305 is further coupled via a conductive soft surface mounted technology (SMT) pad to the printed wiring board (PWB) which provides an electrical coupling between the piezoelectric actuator 305 and the printed wiring board 307.

The apparatus 10 can in some embodiments comprise a rubber force contact 501. The rubber force contact 501 is configured to be located on or be in contact with the piezoelectric actuator 305 approximately halfway along the length of the actuator and translate the bending motion of the piezoelectric actuator to affect a movement of a display assembly. In such embodiments the rubber force contact 501 can be manufactured from any suitable material, such as natural rubber, synthetic rubber, or plastic being capable of transmission of force in a direction. In some embodiments the rubber force contact 501 can be designed to provide a degree of buffering of force or 'damping' between the piezoelectric actuator 305 and the display so to prevent the display experiencing shock and/or damage when the piezoelectric actuator 305 is driven.

The apparatus 10 can in some embodiments further comprise a display 304 or display assembly. The display 304 can comprise any suitable display technology as described herein.

In some embodiments the display 304 is configured to employ a flexible membrane or plate suspension membrane 507.

Figure 2B:
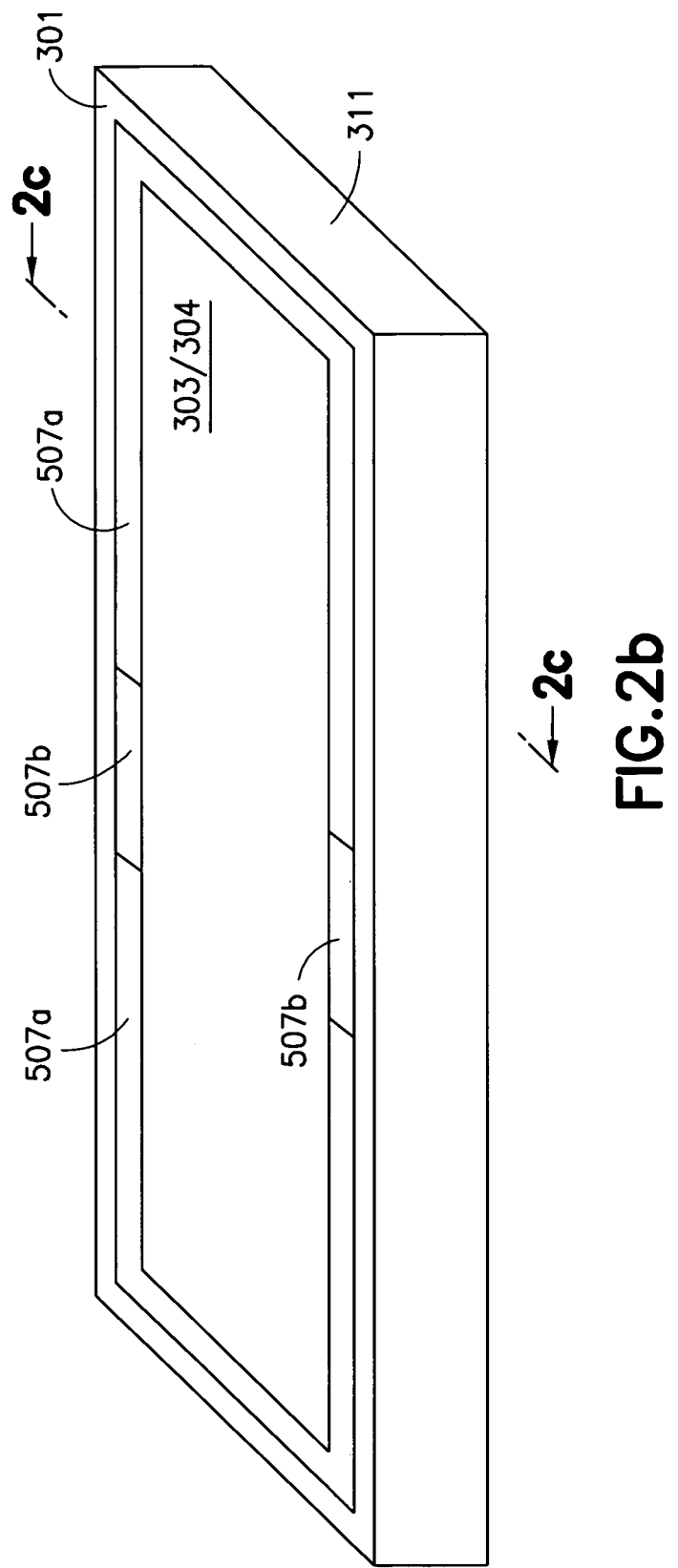
FIG. 2b shows a schematic view of apparatus according to some embodiments.

With respect to FIG. 2b, an example according to some embodiments is shown detailing the plate suspension membrane 507 characteristics. The body part 311 and the frame part 301 as shown in FIG. 2b can form a supporting frame which is configured not only to protect the components of the apparatus but also provide a supporting frame against which the components of the apparatus can be located or react against.

Furthermore in some embodiments the flexible membrane 507 locates the display assembly 304 and the front window 303 with respect to the supporting frame. The flexible membrane 507 in some embodiments can be configured such that it possesses differing characteristics for differing regions. For example a first region or regions 507b of the flexible membrane 507 can present a more rigid characteristic or have a higher degree of inertia when experiencing a force. The first region 507b of the flexible membrane 507 can be located approximately in the region of flexible membrane between at least two actuators so that the effect of actuation on the display assembly 304 and/or front window 303 is damped before it can reach another actuator region of the display assembly 304 and/or front window 303. Furthermore a second region or regions 507a of the flexible membrane can present a less rigid characteristic or have a lover degree of inertia when experiencing a force. The second region 507a can be located approximately in the same location as any transducer so that the transducer can actuate the display assembly 304 and/or front window 303 with less damping effect.

Figure 2C:
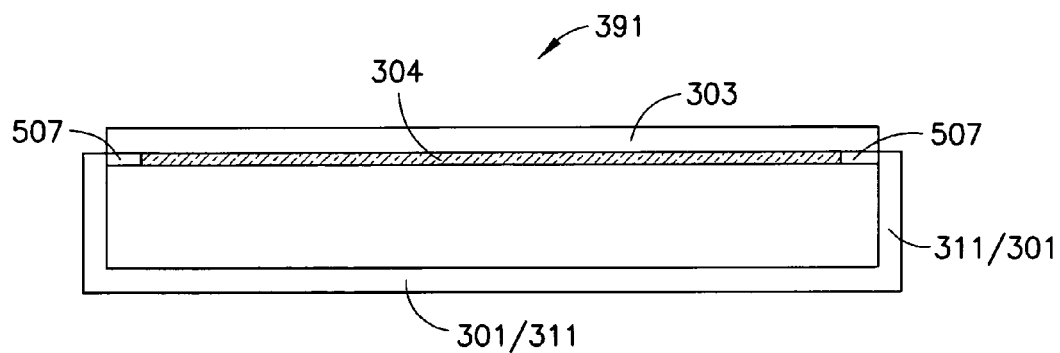
FIG. 2c shows a schematic cross section view of the apparatus shown in FIG. 2b according to some embodiments.

With respect to FIG. 2c a cross-section of the example apparatus shown in FIG. 2b is shown. The cross-section shown is the view taken along the short axis of the apparatus. In such embodiments the second region or regions 507a of the flexible membrane is shown coupling the display assembly 304 to the supporting frame comprising the body part 311 and the frame part 301, with the front window 303 overlying both the display assembly and the flexible membrane 507 or suspension.

With respect to FIG. 2d, a further example according to some embodiments is shown detailing further controlling of the plate suspension membrane 507 characteristics. The body part 311 and the frame part 301 forms the supporting frame which is configured not only to protect the components of the apparatus but also provide a supporting frame against which the components of the apparatus can be located or react against. Furthermore in some embodiments and similar to FIGS. 2b and 2c the flexible membrane 507 locates the display assembly 304 and the front window 303 with respect to the supporting frame. The flexible membrane 507 in these embodiments can be configured such that it possesses a substantially uniform characteristic throughout the range of the flexible membrane.

Figure 2E:
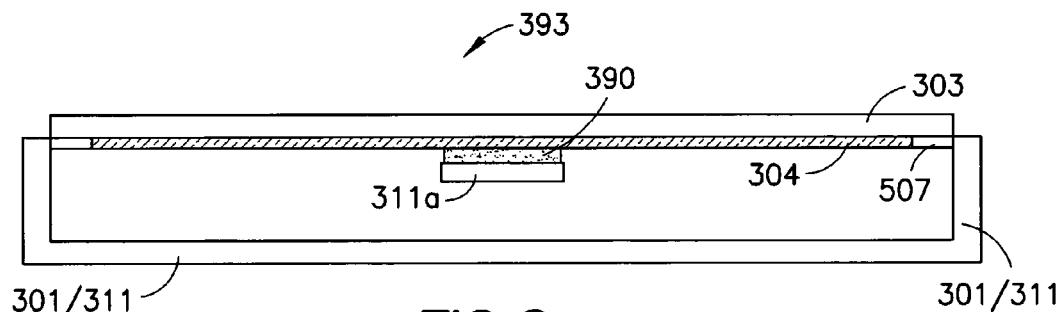
FIG. 2e shows a schematic first cross section view of the apparatus shown in FIG. 2d according to some embodiments.

With respect to FIG. 2e a cross-section of the example apparatus shown in FIG. 2d is shown. The cross-section shown is the view taken along the long axis of the apparatus. In such embodiments the display assembly 304 is coupled to a part of the supporting frame or other supporting structure (such as pcb or battery) via a substantially resilient member. In some embodiments the substantially resilient member can comprise a layer of tape or glue 390. The substantially resilient member 390 can therefore in these embodiments damp the motion of the display assembly 304 and/or front window 303 overlying the display assembly 304 in such a manner that any motion propagating transversely along the display assembly 304 and/or front window 303 is stopped or substantially stopped by the resilient member 390. This therefore produces an effect of significantly increasing the inertia to motion of the display assembly 304 and/or front window 303 coupled to the resilient member 390.

Figure 2F:
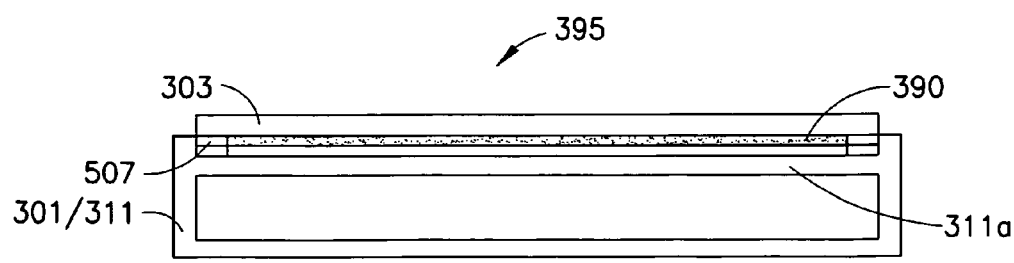
FIG. 2f shows a schematic second cross section view of the apparatus shown in FIG. 2d according to some embodiments.

With respect to FIG. 2f a further cross-section of the example apparatus shown in FIG. 2d is shown. The cross-section shown is the view taken along the short axis of the apparatus. In such embodiments the display assembly 304 is coupled to a part of the supporting frame or other supporting structure rigidly coupled to the supporting frame.

The example shown in FIG. 3 shows the flexible membrane being located in contact or substantially in contact with the rubber force contact and suspended at least partially at a periphery of the flexible membrane 507 between the frame part 301 and body part 311. In some embodiments as shown in FIG. 3 the flexible membrane 507 is sandwiched at the periphery of the membrane between the body part 311 and the frame part 301 and located by a suspension ring 509 attached to the flexible membrane 507 and located within a suspension ring recess 513 formed on the inner surface of the body part 311. In some embodiments the suspension ring 509 can be formed as a substantially thickened section of the flexible membrane 507.

In some embodiments the inner surface of the body part 311 can be attached to the flexible membrane 507 via an adhesive layer. In some embodiments the adhesive layer extends beyond the static area of contact between the inner surface of the body part 311 and the flexible membrane 507 in order to provide additional protection at any dynamic area of contact between the inner surface of the body part 311 and the flexible membrane 507. The flexible membrane 507 in some embodiments may be manufactured from an elastomer. The elastomer in some embodiments may be any suitable film or foil. For example the suitable film or foil may be in various embodiments a polyethylene terephthalate (PET) film, a polycarbonate (PC) foil, or a silicone foil.

The flexible membrane 507 in such embodiments can furthermore be attached via a further adhesive layer to a surface of the frame part 301. The body part 311 and the frame part 301 thus in these embodiments locates at least some of the flexible membrane. In some embodiments the junction between the surfaces of body part 311 and the frame part 301 are configured with a fillet or chamfer to smooth the junction for a similar reason as above for protecting the membrane while the membrane is dynamic. Similarly in some embodiments the further adhesive layer may extend beyond the static area of contact to provide additional protection at any dynamic area of contact.

The flexible membrane 507 can be constructed out of polyethylene terephthalate (PET) polyester film. In some embodiments the film can be biaxially oriented polyethylene terephthalate which may be used because of its high tensile strength, chemical and dimensional stability, transparency and also electrical insulation properties. The PET flexible membrane layer can in some embodiments be approximately 0.01 to approximately 1 mm thick as this thickness has been shown to provide both the flexibility in response to forces from the user and from the actuator but also has sufficient tensile strength not to break under such forces. The PET flexible membrane 211 can be constructed by any suitable means. For example the PET layer may be constructed by extrusion onto a chill roll which quenches it into an amorphous state. The PET flexible membrane layer furthermore in some embodiments can be constructed in such a way that the crystallites grow rapidly but reach the boundary of neighbouring crystallites and remain smaller than the wavelength of visible light and thus produce a film having excellent clarity.

In some embodiments the display assembly 304 can further comprise a display element. The display element can in some embodiments comprise a static display array located beneath the front window 303 and projected up to the user through the front window 303.

The graphic layer can comprise any suitable material for blocking projected light. In such embodiments the graphic layer can be approximately 0.05 to approximately 0.07 mm thick. Furthermore in some embodiments the graphic layer can be printed directly onto the underside of the front window 303. In some other embodiments, for example where the display element is a dynamic display, the graphic layer can comprise any suitable material for permitting the controllable and selectable projection of light—for example a liquid crystal display element and colour filter layer, E-ink etc.

The graphic layer can in some embodiments be coupled to the flexible membrane 507 via an optically clear adhesive (OCA) layer. The optically clear adhesive layer can be approximately 0.025 to approximately 0.05 mm thick and can be the same material as other OCA layers.

The static display array in some embodiments can also comprise a graphic layer which may be connected to the front window 303 by a first optically clear adhesive (OCA) layer. The first optically clear adhesive layer may be approximately 0.025 to approximately 0.05 mm thick and be any suitable OCA material.

The display assembly 304 in some embodiments further comprises a touch sensor for example a capacitive touch sensor located over the display element.

The capacitive touch sensor can in some embodiments comprise a series of layers. The layers in the capacitive touch sensor can comprise at least one Indium Tin Oxide on PET layer, and a protective hard coated PET layer. Each layer can in some embodiments be fixed to the neighbouring layers by the use of an optically clear adhesive to form a sandwich of layers.

The display element for example can in some embodiments be connected via a second layer of optically clear adhesive (OCA) to a first layer of indium tin oxide (ITO) on PET. The second layer of OCA can in some embodiments be approximately 0.025 to approximately 0.05 mm thick.

The first layer of indium tin oxide (ITO) on PET in some embodiments is the first of the capacitive touch interface layers. In other words the first ITO on PET layer provides a first layer capable of detecting the capacitive coupling produced by the user's finger when it touches the front window 303. The first layer of ITO on PET can in some embodiments be approximately 0.05 to 0.2 mm thick.

The first layer of ITO on PET layer can be connected to a second ITO on PET layer via a third layer of optically clear adhesive (OCA). The third layer of OCA can in some embodiments be approximately 0.025 to approximately 0.05 millimetres thick.

The second layer of ITO on PET can in some embodiments be a further layer capable of detecting the capacitive coupling produced by the user's finger when it touches the front window 303. The second ITO on PET layer can in some embodiments be approximately 0.05 to approximately 0.2 mm thick.

Although the capacitive touch interface layers have been described as being ITO on PET layers it would be understood that the capacitive touch interface layers may comprise any suitable material, for example ITO on glass.

In some embodiments the display comprises a protective or front window 303.

The front window 303 can in some embodiments be manufactured from glass. In some embodiments the glass may be coated with optical (to reduce glare) or oleophobic (to resist fingerprints) films to enhance the characteristics of the front window. The front window 303 can in some embodiments overlay the other display components and is configured to protect the other display components. In such embodiments, the front window 303 made from glass can be approximately 0.5 to approximately 1.2 millimetres thick.

In some other embodiments the front window 303 can be manufactured from a plastic or other protective screen material suitable for both enabling the other components from performing their tasks and protecting the other components from physical or other damage. For example the front window 303 can in some embodiments provide a dielectric material between a capacitive touch interface touch sensor and the user's finger, while the front window 303 is also sufficiently transparent to permit any display elements under the window being seen by the user.

The front window 303 for example as shown in FIG. 3 covers the touch sensor 503 and in some embodiments can be connected by a further layer of optically clear adhesive.

Although the above example is described where the touch sensor covers the display element which lies on the flexible membrane layer 507 it would be understood that the layers could be reordered into any suitable arrangement.

Furthermore in some embodiments the display element can employ further layers such as a light guide layer for projecting a light towards the user. The light guide layer can be formed from any suitable material for conveying a light from a light source (not shown) and projecting the light to the user. In some embodiments the light guide can diffuse the light to produce a more pleasing display image.

Furthermore in some embodiments the display element can employ a hard coated PET layer which can provide both support for and protect the display and/or flexible membrane from physical damage.

In some other embodiments the display element is not a filtering display where a uniform (or generally uniform) light source is filtered to produce an image but may be a generated display such as an light emitting diode (LED) or active matrix organic light emitting diode (AMOLED) display.

In some embodiments the flexible membrane layer 507 can be manufactured as one of the other above described PET films. For example the flexible PET membrane may be an extension of one of the ITO on PET layers extended beyond the shape of the touch sensor to enable it to be fixed to the case. In such embodiments the ITO on PET layer may thus be both the flexible membrane and be sensitive to capacitive changes.

Although the above examples feature the flexible membrane as a PET layer it would be understood that any suitable material may be employed. For example in some embodiments the flexible membrane may be formed by a polycarbonate layer. In such embodiments a thickness of approximately 0.1 mm polycarbonate may provide sufficient tensile strength and flexibility.

The flexible membrane 507 can be in some embodiments considered to be a laminar film or layer which is located at least at some contact area to an inner part comprising at least one of the window, touch sensor and display element and at least at some other contact area to the outer part comprising at least one of the frame or body part. The flexible membrane 507 furthermore in these embodiments maintains a flexible connection between the inner part and the outer part. In other words the flexible membrane 507 is configured in these embodiments to be flexible in that it is elastic in nature such that when pressure is applied to the front window 303 the flexible membrane 507 can move or flex relative to the frame or body part and thus the inner part can move relative to the outer part.

Furthermore the flexible membrane layer 507 in such embodiments can permit without undue damping the transmission of force generated by a piezoelectric actuator 305 such as a force of 1 to 2 N to the display assembly 304 can be sensed by the user.

Furthermore the flexible membrane 507 together with the rubber force contact 501 in some embodiments can further limit the motion of the inner part relative to the outer or peripheral part. The flexible membrane 507 and the rubber force contact 501 may therefore prevent the inner part from 'hovering'. Hovering is an effect experienced by a user where when the inner and outer parts can move laterally as well as vertically with respect to each other. This for example is found in systems where gaskets wear or are loose and thus produce a slipping, tipping or rolling motion of the inner part relative to the peripheral part. This effect is especially noticeable in large touch interfaces and touch screen displays. This hovering may not only be unpleasant to interact with as the button press feels broken, but may vibrate and generate a buzzing or noise which would lead the user to think that the product was faulty or sub-standard.

In some embodiments the flexible membrane 507 is irregular in thickness along at least one of the axis of the membrane. This can for example produce the result of defining the first region of the flexible membrane and the second region of the flexible membrane as shown in FIGS. 2b and 2c. For example as shown in FIG. 3 and FIG. 4 the thickness of the flexible membrane 507 in such embodiments can be configured such that the flexible membrane 507 has a narrowing profile which has a maximum thickness approximately at the centre of the longest axis of the flexible membrane/display assembly. In other words the flexible membrane is configured to be thickest 521 at a region close to the centre of the major axis of the device and thinnest 353 at the ends of the major axis. In some embodiments the profile thickness changes for the periphery of the flexible membrane 507, in other words at the interface between the display assembly and case so to reduce the mass of the membrane. In some other embodiments the flexible membrane 507 profile changes for the complete 'width' of the flexible membrane 507 for manufacturing simplicity.

The effect of the changing profile of the flexible membrane 507 is such that the thicker the membrane the greater inertia the display assembly has because of the reduction in flexibility of the membrane at that point. In other words the thicker the membrane the greater damping effect the flexible membrane produces. In such embodiments where the thickness is greatest at the approximate centre point between two actuators 305 as can be seen with respect to FIG. 5, by the arrow head and the green line.

The flexible membrane 507 is thus in embodiments when thin is light and does not therefore produce significantly more undamped weight in addition to the mass of the suspended display assembly to be moved by the piezoelectric actuator 305.

However the flexible membrane 507 is thus in embodiments when thicker is heavier and produces more undamped weight in addition to the mass of the suspended display assembly to be moved by the piezoelectric actuator 305. In some embodiments the elasticity or flexibility of the flexible membrane 507 is such that it enables a vertical or sheer displacement of the display assembly with respect to the body part 311/frame part 301 such that the user experiences a response similar to that of pressing a physical key or button.

In some further embodiments, the flexible membrane 507 is applied across the apparatus extending to thus provide a dust and moisture proof seal protecting the delicate electronic circuitry and mechanical components from water, dust, or other materials.

Furthermore the apparatus 10 comprises a frame part 301 configured to locate the display assembly 304 in relation to the body part 311 as described herein.

In some embodiments the piezoelectric actuator 305 can be modulated in such a way that the modulation transmitted via the flexible membrane laminar to the display 304 causes the display 304 to generate audible oscillations. In other words in some embodiments the display can be used as a flat panel speaker structure where the flexible membrane 305 provides sufficient damping (but not under-damping or over-damping) in the transmission of the piezoelectric actuated vibration to the display 304.

In some embodiment the operation of the transducers on the display can be employed not only to generate audible oscillations but also to provide haptic feedback. With respect to FIGS. 6a and 6b an example actuator system is shown suitable for generating both audible oscillations and also haptic feedback. With respect to FIG. 6a a schematic view of such an actuator system 400 is shown. The actuator system 400 can in some embodiments be configured to receive both haptic or vibration input signals for generating haptic movement of the actuators 305 and thus the display 304 assembly and also to receive an audio input signal for generating acoustic movement of the actuators 305 and thus the display 304. The haptic or vibration input signal can in some embodiments be a sine wave (or series of sine waves) which are tuned to the mass/spring resonance characteristics of actuator 305 and display 304. Furthermore in some embodiments the haptic or vibration input signal can in some embodiments be a sine wave (or series of sine waves) with a frequency of less than 500 Hz such that they do not fall within the sensitive region of human hearing.

The actuator system 400 furthermore in some embodiments comprises a low pass filter 401 configured to receive the haptic or vibration input signal and output a frequency limited signal to a summation device 405 or summer. In some embodiments the cut off frequency of the signal should be chosen such that the output of the low pass filter 401 has a cut off region from 100 to 500 Hz.

The actuator system 400 furthermore in some embodiments comprises a high pass filter 403 configured to receive the audio input signal and output a frequency limited signal to a summation device 405 or summer. In some embodiments the cut off frequency of the signal should be chosen such that the output of the high pass filter 403 has a cut off region from 100 to 500 Hz. Furthermore in some embodiments the cut off region of the high pass filter 403 is chosen to be higher than the cut off region of the low pass filter 401 such that the output filtered haptic signals and the output filtered audio signals do not have significant content on the same frequencies. This can be seen for example in FIG. 6b where the filtered vibra 421 and audio 423 signals do not significantly overlap in frequency.

The actuator system 400 in some embodiments further comprises a summation device configured to receive output filtered haptic signals and the output filtered audio signals and combine them before outputting them to an actuator amplifier 407. In such embodiments the combined output filtered haptic signals and the output filtered audio signals having been filtered such that they have little or no content on the same frequencies produce an output with an improved sensitivity and clearness of vibration.

The actuator system 400 in some embodiments can further comprise an actuator amplifier 407 configured to receive the combined filtered audio and haptic signals and generate a signal suitable for driving the actuator or actuators 305.

The actuator system 400 furthermore comprises an actuator 305 configured to receive the output of the actuator amplifier 407 and generate movement of the display 304 suitable for generating both an audible output and also haptic output.

It would be understood that although the above system is described with respect to a single channel audio signal that a multichannel audio signal could be implemented using the similar apparatus and methods. For example for each audio channel a separate channel pathway of high pass filter, summer, amplifier and actuator could be used with a common vibration low pass filter for the vibration signal outputting a filtered vibration signal to each audio channel summation device.

Furthermore it would be understood that although the filters as described herein as low pass or high pass filters with respect to the actuator system 400 and multi-channel actuator system 500 they could be implemented as any suitable bandpass filter configuration.

In such embodiments the user can at the same time listen to music using the display and get haptic feedback from the device to support a text type input. Furthermore as the audio playback contains no or little frequency components in the vibration frequency area and the vibration signal contains no or little frequency components in the audio frequency area, the user can easily distinguish the vibration/haptic feedback from the music playback. In other words by using the high and low pass filtering in such embodiments the fidelity of these two simultaneous signals reproduced by the display is improved.

Figure 6A:
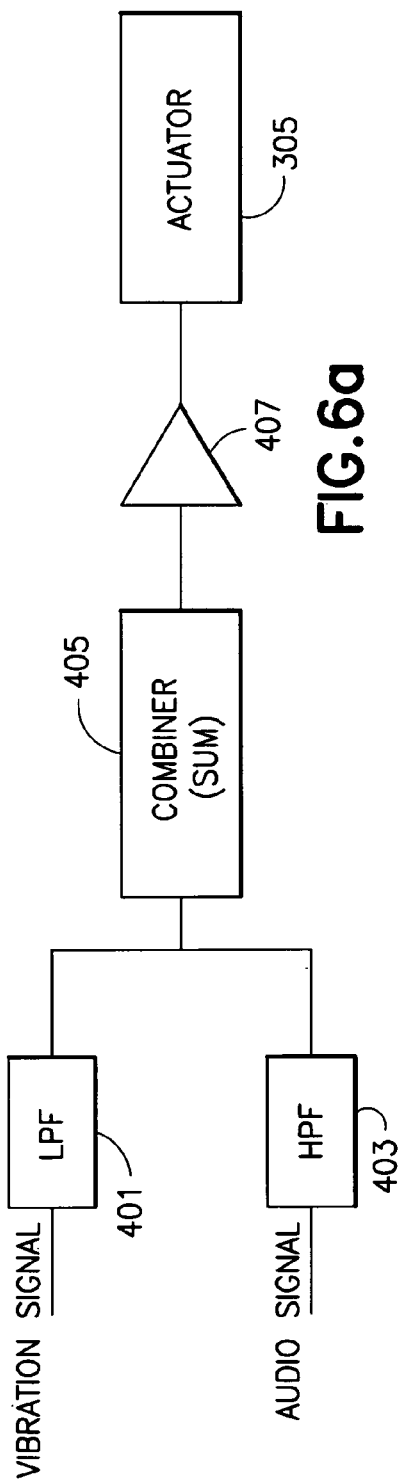
FIG. 6a shows a schematic view of a signal combiner according to some embodiments.
Figure 6B:
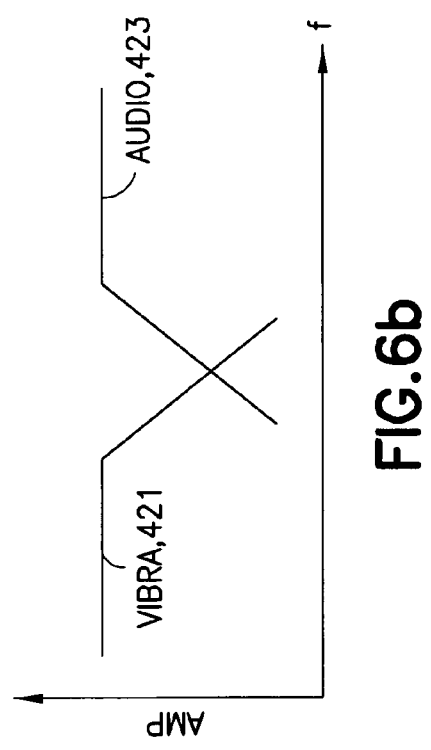
FIG. 6b shows a schematic view of a frequency response for the signal combiner according to some embodiments.
Figure 7:
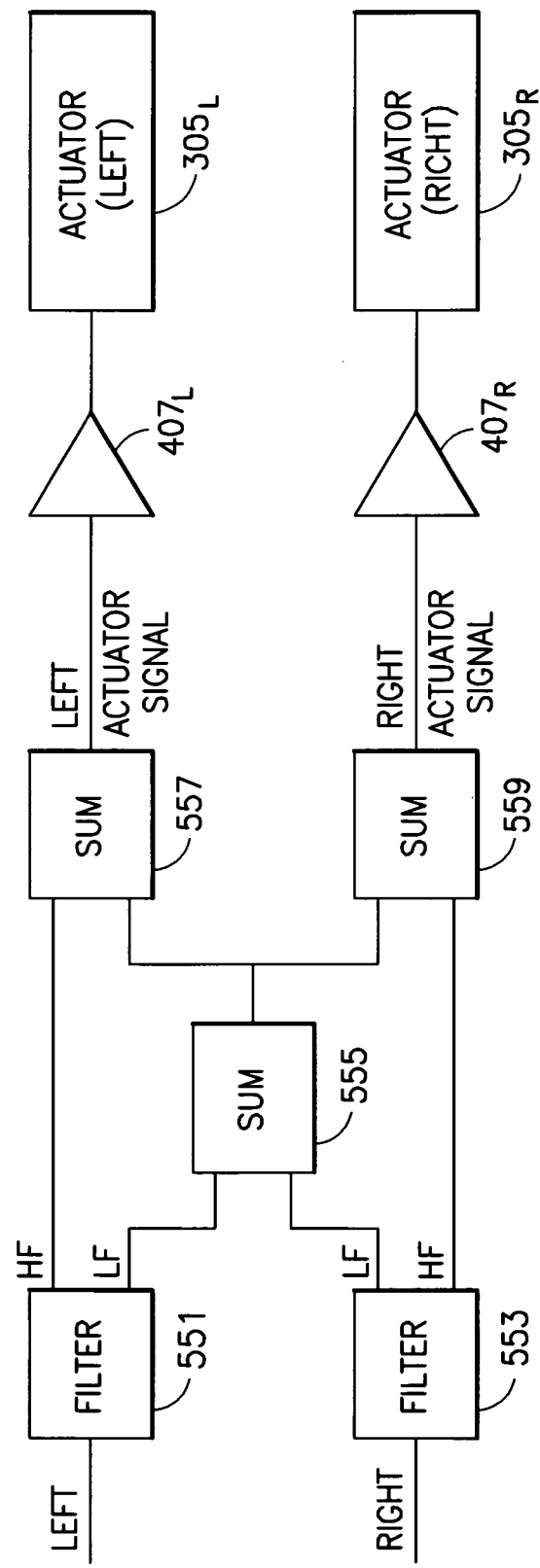
FIG. 7 shows a schematic view of a channel separator according to some embodiments.

With respect to FIG. 7 a multichannel actuator system is shown which can be used either in combination with the example actuator system shown in FIG. 6a or can be used separately from. In such embodiments where the actuator system 4 shown in FIG. 6a is combined with the multichannel actuator system 500 shown in FIG. 7 the each of the left actuator signal and right actuator signals can be the audio signal input to the high pass filter. In some further embodiments any suitable re-arrangement or merging of components could be furthermore be implemented by the person skilled in the art when combining the two example actuator systems. With respect to the example shown in FIG. 7 the multichannel system is a stereo or two channel system. However it would be appreciated that any suitable number of channels can be implemented by applying minor modifications to the examples shown.

The multichannel actuator system 500 in some embodiments can comprise a first filter 551 configured to receive the first audio channel signal, which in the example shown in FIG. 7 is the left channel audio signal. The first filter is configured to generate a lower frequency (LF) band output and a higher frequency (HF) band output. In some embodiments the first filter 551 comprises a quadrature mirror filter structure. In some embodiments the lower frequency—higher frequency cut off is in the range from 500 to 1000 Hz. The higher frequency (HF) output components are passed to a first channel summation device (sum) 557 or signal combiner. The lower frequency (LF) output components are passed to a central summation device (sum) 555.

The multichannel actuator system 500 furthermore in some embodiments can comprise a second filter 553 configured to receive the second audio channel signal, which in the example shown in FIG. 7 is the right channel audio signal. The second filter 553 is configured to generate a lower frequency (LF) band output and a higher frequency (HF) band output. In some embodiments the second filter 553 comprises a quadrature mirror filter structure. In some embodiments the lower frequency—higher frequency cut off is the same as the first filter 551 cut off, in other words in the range from 500 to 1000 Hz. The higher frequency (HF) output components are passed to a second channel summation device (sum) 559 or signal combiner. The lower frequency (LF) output components are passed to the central summation device (sum) 555.

In such embodiments the multichannel actuator system 500 furthermore comprises a central summation device 555. The central summation device receives the lower frequency band components from each audio channel and generates a combined lower frequency component signal. The combined lower frequency signal is passed to each of the channel summation devices. Thus for example as shown in FIG. 7 the combined lower frequency signal is passed to the first channel summation device 557 and the second channel summation device 559.

The multichannel actuator system 500 furthermore in some embodiments comprises a first channel summation device 557. The first channel summation device 557 is configured to receive the first channel higher frequency signal from the first channel filter 551 and the combined lower frequency signal from the central summation device 555 and combine them to produce a first (left) actuator audio signal. The first actuator audio signal can then in some embodiments be output to a first (left) actuator amplifier $407_L$.

In some embodiments the multichannel actuator system 500 comprises a first (left) actuator amplifier $407_L$. The first actuator amplifier $407_L$ can in such embodiments be configured to receive the first actuator audio signal and generate a signal suitable for driving the first (left) actuator $305_L$.

The multichannel actuator system 500 furthermore in such embodiments comprises a first (left) actuator $305_L$ configured to receive the output of the first actuator amplifier $407_L$ and generate movement of the display 304 suitable for generating an audible output dependent on the first channel audio signal.

The multichannel actuator system 500 furthermore in some embodiments comprises a second channel summation device 559. The second channel summation device 559 is configured to receive the second channel higher frequency signal from the second channel filter 553 and the combined lower frequency signal from the central summation device 555 and combine them to produce a second (right) actuator audio signal. The second actuator audio signal can then in some embodiments be output to a second (right) actuator amplifier $407_R$.

In some embodiments the multichannel actuator system 500 further comprises a second (right) actuator amplifier $407_R$. The second actuator amplifier $407_R$ can in such embodiments be configured to receive the second actuator audio signal and generate a signal suitable for driving the second (right) actuator $305_R$.

The multichannel actuator system 500 furthermore in such embodiments comprises a second (right) actuator $305_R$ configured to receive the output of the second actuator amplifier $407_R$ and generate movement of the display 304 suitable for generating an audible output dependent on the second channel audio signal.

With respect to FIG. 5 an example of the operation of the piezoelectric actuators 305 are shown with respect to the multichannel actuator system and the variable profile flexible membrane embodiments. In FIG. 5 each piezoelectric actuator 305 is configured to vibrate in such a way that the bending moment of the piezoelectric actuator 305 transfers a force via the rubber force contact 501 to the display assembly 304 attempting to cause the display to move 1003 substantially in translational mode of displacement. However because of the effect of the variable profile flexible membrane the display assembly 304 moves such that the force causes a bending or pivoting about the thickened profile region display assembly 304.

Thus in such embodiments the vibration caused by each transducer is relatively isolated from the vibration caused by the other transducers separated by the thickened membrane. It is therefore in such embodiments possible to produce stereo or other multi-channel sound images using a single display assembly without the problem of unclear sound imagery caused where the vibration from one channel propagates to the other audio channel areas of the display assembly.

Furthermore by employing in some embodiments the multichannel actuator system 500 the lower frequency audio signals, which are generally not directionally determined by the user, by being generated by all of the actuators can generate an audio signal of suitable volume. In other words the driving signals received by each actuator are modified so that the highest frequencies components carry the different content (left and right). The lower frequencies components (cut-off somewhere in 500-1000 Hz) having been summed together can be output as a mono (or single channel signal) so that the display assembly/plate movement is similar on both sides for lower frequencies. In such embodiments therefore the higher frequency components (higher than the cut-off) give the stereo sound 'feeling'.

The display assembly 304 thus can produce a sufficient air displacement to generate audio signals with sufficient amplitude to implement not only earpiece operations but also to provide speaker operations such as for example integrated hands free speaker operations.

Furthermore as in some embodiments there are no magnetic parts required there are no issues concerning metal dust or other contaminants. Furthermore as the flexible membrane, frame part and body part can in some embodiments form a seal the whole system is easy to seal from moisture and dust as no sound holes are required and apparatus can be easily weather proofed. Furthermore in embodiments by using the display assembly as both display and air mass driver no internal audio transducers are required thus reducing required volumes and space and allowing thinner and more aesthetically pleasing products to be designed.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
a first part configured to form at least part of a case of the apparatus;
a second part configured to form at least part of a display for the apparatus;
at least a first actuator and a second actuator coupled to the second part at different regions and configured to actuate the second part to generate a displacement of the second part wherein the displacement caused by the first actuator is substantially isolated from the displacement caused by the second actuator;
circuitry coupled to the at least first actuator and second actuator and configured to drive the at least first actuator and second actuator separately; and
suspension means comprising a flexible membrane configured to couple to the first part and the second part;
wherein the second part is configured to be substantially resiliently coupled to the first part at an area approximately at the center of the longest axis of the flexible membrane so as to damp the motion of the second part; and
wherein the coupling of the second part to the first part is such that the flexible membrane is configured to be more resilient at the center of the longest axis and less resilient at ends of the longest axis.

2. The apparatus as claimed in claim 1, wherein the circuitry comprises:
an audio signal filter configured to receive an audio signal;
a vibration signal filter configured to receive a vibration signal; and
a combiner configured to combine an output of the audio signal filter and an output of the vibration signal filter.

3. The apparatus as claimed in claim 2, wherein the audio signal filter comprises a high pass filter.

4. The apparatus as claimed in claim 2, wherein the vibration signal filter comprises a low pass filter.

5. The apparatus as claimed in claim 1, wherein the circuitry comprises:
a first channel filter configured to receive a first actuator channel signal;
a second channel filter configured to receive a second actuator channel signal.

6. The apparatus as claimed in claim 5, wherein the circuitry further comprises a first combiner configured to combine a lower frequency component of the filtered first actuator channel signal and a lower frequency component of the filtered second actuator channel signal;
a first channel combiner configured to combine the combined lower frequency components of the filtered first actuator channel signal and the filtered second actuator channel signal and a higher frequency component of the filtered first actuator channel signal; and
a second channel combiner to combine the combined lower frequency components of the filtered first actuator channel signal and the filtered second actuator channel signal and a higher frequency component of the filtered second actuator channel signal.

7. The apparatus as claimed in claim 6, wherein the circuitry is configured to couple the first channel combiner output to the first actuator and the second channel combiner to the second actuator.

8. The apparatus as claimed in claim 1, wherein the suspension means comprises the flexible membrane configured to have a higher degree of inertia at a first region than a second region of the flexible membrane.

9. The apparatus as claimed in claim 8, wherein the first region of the flexible membrane is approximately located between the at least first actuator and second actuator.

10. The apparatus as claimed in claim 1, wherein the suspension means is configured to be non uniform in profile and comprises a maximum thickness at an area approximately at the center of the longest axis of the flexible membrane.

11. The apparatus as claimed in claim 1, wherein the second part is coupled to the first part by a substantially resilient member so as to substantially stop motion propagating transversely along the second part.

12. The apparatus as claimed in claim 1, wherein the first part comprises:
   a body part; and
   a frame part, wherein the suspension means is configured to be attached between the body part and the frame part.

13. The apparatus as claimed in claim 1, wherein the second part comprises at least one of:
   a front window layer;
   at least one display layer; and
   at least one touch interface layer.

14. The apparatus as claimed in claim 13, wherein the suspension means is configured to be correspondingly coupled to the at least one of: the front window layer, the at least one display layer, and the at least one touch interface layer.

15. The apparatus as claimed in claim 1, wherein the suspension means comprises a suspension ring configured to be located within a recess of the first part, wherein the suspension ring and the recess of the first part form a first area of contact.

16. The apparatus as claimed in claim 1, wherein at least one of the first actuator and second actuator is at least one of:
   a piezoelectric actuator;
   a dynamic eccentric mass actuator;
   a moving coil actuator; and
   a moving magnet actuator.

17. The apparatus as claimed in claim 1, wherein the suspension means comprises at least one of:
   an elastomer;
   a silicone foil;
   a polyethylene terephthalate (PET) polyester film; and
   a polycarbonate film.

18. A method of operating an apparatus comprising a first part configured to form at least part of the case of the apparatus and a second part configured to form at least part of the display for the apparatus, the method comprising:
   coupling at least a first actuator and a second actuator to the second part at different regions;
   applying a force, by the at least first actuator and second actuator, to the second part to generate a displacement of the second part, wherein the displacement caused by the first actuator is substantially isolated from the displacement caused by the other actuator;
   coupling circuitry to the at least first actuator and second actuator for driving the at least first actuator and second actuator separately; and
   coupling by a suspension means the first part and the second part, the suspension means comprising a. flexible membrane;
   wherein the second part is configured to be substantially resiliently coupled to the first part at an area approximately at the center of a longest axis of the flexible membrane so as to damp the motion of the second part; and
   wherein the coupling of the second part to the first part is such that the flexible membrane is configured to be more resilient at the center of the longest axis and less resilient at ends of the longest axis.

19. The method as claimed in claim 18, wherein driving the at least first actuator and second actuator comprises:
   filtering an audio signal;
   filtering a vibration signal; and
   combining an output of the audio signal filtering and an output of the vibration signal filtering.

20. The method as claimed in claim 18, wherein the flexible membrane is non-uniform in profile.

21. The method as claimed in claim 18, wherein the second part is coupled to the first part using an adhesive layer.

\* \* \* \* \*